United States Patent [19]

Zimmer

[11] 3,997,120

[45] Dec. 14, 1976

[54] MILL FOR GRINDING VEGETABLE PRODUCTS

[76] Inventor: Raymond Zimmer, 14, rue du Chateau, Horbourg (Bas-Rhin), France

[22] Filed: Nov. 17, 1975

[21] Appl. No.: 632,714

Related U.S. Application Data

[63] Continuation-in-part of Ser. No. 388,924, Aug. 16, 1973, Pat. No. 3,921,919.

[30] Foreign Application Priority Data

Aug. 31, 1972  France .............................. 72.31644

[52] U.S. Cl. .................................. 241/56; 241/246
[51] Int. Cl.² .......................................... B02C 9/00
[58] Field of Search .......... 241/100, 244, 245, 246, 241/248, 257 R, 55, 56

[56] References Cited

UNITED STATES PATENTS

| | | | |
|---|---|---|---|
| 2,549,275 | 4/1951 | Wood | 241/246 |
| 3,921,919 | 11/1975 | Zimmer | 241/56 |

*Primary Examiner*—Granville Y. Custer, Jr.
*Attorney, Agent, or Firm*—Young & Thompson

[57] ABSTRACT

A mill for grinding vegetable products comprises a fixed upper annular millstone in engagement with a lower rotatable millstone. The upper annular millstone has a central opening through which vegetable products such as grains are fed. Fixed to and extending axially upwardly from the lower millstone is a screw that extends in spaced relation through the central opening of the upper millstone and is threaded in a direction such that upon rotation of the lower millstone, the screw turns in such a direction as to serve as a screw conveyor to move material upwardly. In this way, the screw acts to unblock the passageway and prevent the bridging over of material such as might clog the mill. The screw terminates upwardly in a cutaway portion that provides an agitator offset to one side of the lower portion of the screw; and this offset portion serves as a stirrer to prevent clogging.

6 Claims, 3 Drawing Figures

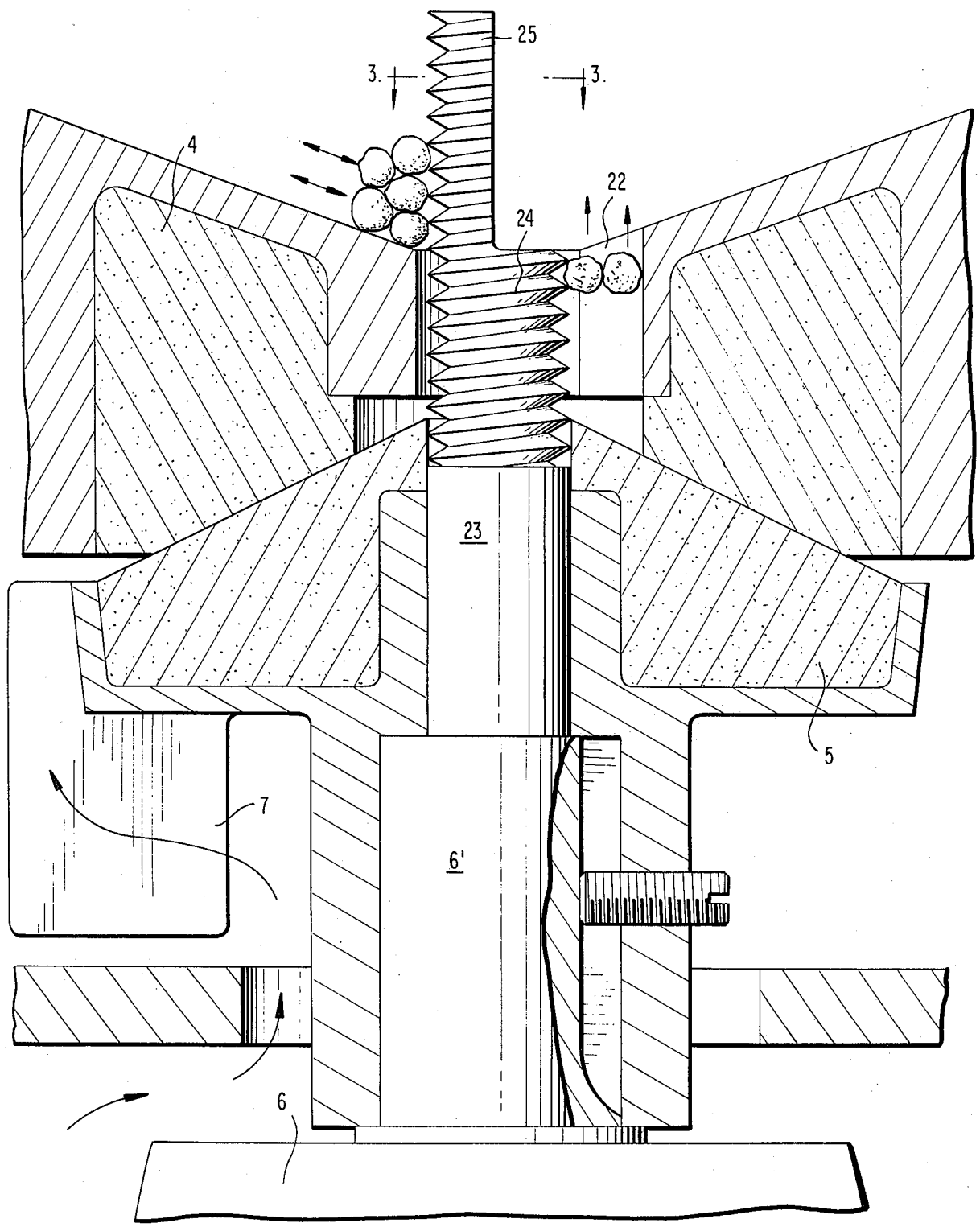

MILL FOR GRINDING VEGETABLE PRODUCTS

The present application is a continuation-in-part of copending application Ser. No. 388,924, filed Aug. 16, 1973, and now U.S. Pat. No. 3,921,919, issued Nov. 25, 1975.

The present invention relates to the production of meslins and flours commencing with various vegetable products such as, for example, cereals or legumes.

In infant and adult human dietetics, as well as in the feeding of animals, the freshness of the meslins of the different vegetable products is of fundamental importance. In practice, flours prepared too long in advance lose a part of their nutritive or gustatory qualities and may even, by oxidation in the air, become degraded or even noxious.

The utilization of the principle of grinding-pounding, such as is carried out in domestic coffee grinders, does not permit the production of fine flours and is totally inappropriate for the milling of cereals, legumes and grains of different varieties utilized in dietetics.

The ancient process of the dehusking and comminution of grain between fixed and rotary millstones remains the process of choice for dietetic purposes.

However the known mechanisms which are characterized by relatively slow velocities of the millstones and by a great pressure are not applicable, by reason of their weight, their volume, their inertia, and their purchase price, to a family or domestic utilization, in which the apparatus utilized must remain easy to handle, easy to operate, of small size, and inexpensive.

The present invention has as one object to provide an apparatus in the form of a mill, retaining the principle of the millstones, and permitting domestic or dietetic center utilization for the milling of various vegetable products utilized in dietetics, in proportion according to needs, whilst thus preserving all their properties.

Another object of the present invention is to provide such a mill, that is adapted to prevent clogging and to ensure continued feed of the vegetable products toward the region between the millstones.

Finally, it is an object of the present invention to provide such a mill, which will be relatively simple and inexpensive to manufacture, easy to operate, maintain and repair, and rugged and durable in use.

Briefly, the present invention comprises a mill in the form of a pair of superposed millstones the upper of which is fixed and annular and the lower of which is rotatable in contact with the upper millstone. Feed to the region between the millstones is through the central opening of the upper millstone; and a screw extends upwardly from and is rotatable with the lower millstone. The screw turns with the lower millstone in a direction such as to serve as an upwardly feeding screw conveyor, which serves to unblock the feed at the same time that it permits gravity feed. The upper end of the screw is extended upwardly beyond the upper millstone, in a cutaway portion offset to one side of the lower portion of the screw; and this offset portion serves as a stirrer for the mass of grain that rests on the upper surface of the upper millstone.

These and other objects, features and advantages of the present invention will become apparent from a consideration of the following description, taken in connection with the accompanying drawings, in which:

FIG. 2 is an enlarged cross-sectional view of the millstones and unblocking mechanism of the present invention; and FIG. 3 is a cross-sectional view taken on the line 3—3 of FIG. 2.

Figure 1:
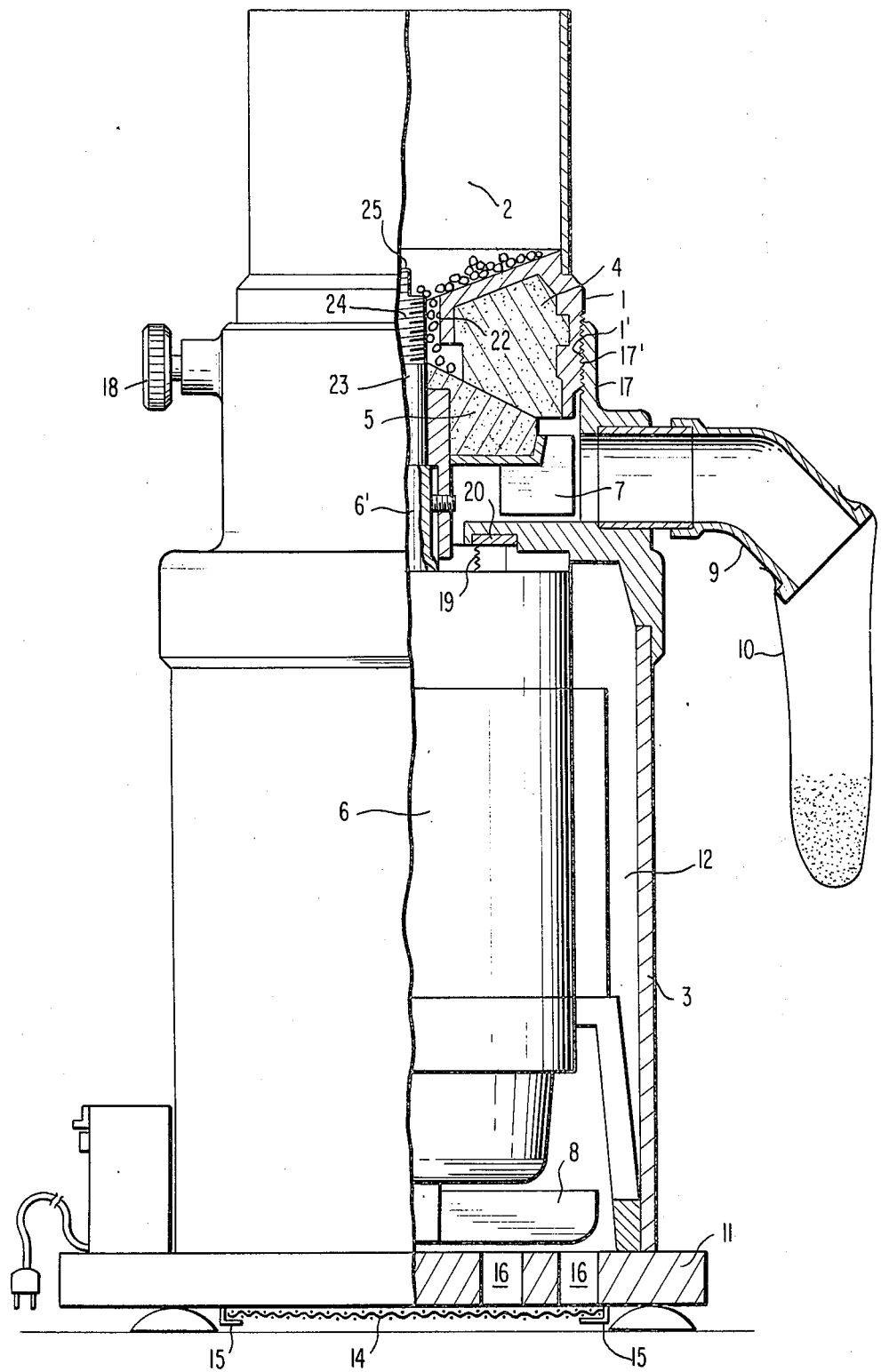
FIG. 1 is a view partly in cross section and partly in side elevation, of a mill according to the present invention.

Referring now to the drawings in greater detail, and first to FIG. 1, there is shown a mill according to the present invention, comprising a casing including an upper cylindrical body 1 supporting a hopper 2, and a likewise cylindrical lower support 3. Within the casing is an upper millstone 4 fixed in a rigid manner in the body 1, a rotating nether millstone 5 secured upon the shaft 6' of a motor 6 mounted in the support 3, and two fans 7 and 8. An outlet spout 9 to which is attached a bag 10 projects laterally from the casing.

Between the motor 6 and the support 3, both of which are secured upon a base 11, there is a ventilation chamber 12 serving for the cooling of the motor 6 by virtue of the fan 8 drawing the air through a filter 14 fixed, for example by means of two rails 15, below the base 11, and through openings 16 provided in the base 11.

The support 3 comprises a connecting piece 17 furnished at its upper extremity with an internal screw threading 17' cooperating with an external screw threading 1' of the body 1. The relative displacement between the body 1 and the connecting piece 17 determines the spacing between the two millstones 4 and 5 and thus the grade or size of the meslins. From this it follows that in order to obtain the necessary precision the screw threading connecting the connecting piece 17 and the body 1 is of the micrometric type.

In order to ensure fixation of the selected position of regulation, on the connecting piece 17 there is provided a locking system, for example in the form of a screw 18.

Between the upper part of the motor 6 and the rotary nether millstone 5 there are provided a second air filter 19, a plate 20 for locating the filter 19 and provided with holes for the passage of the air, and a second fan 7, which discharges toward the outlet spout 9 and toward the bag 10 which is fixed thereto to receive the meslins produced by the two millstones 4 and 5.

The current of air created by the fan 7 around the base of the millstones 4 and 5 obviates the accumulation of the meslins and the clogging of the millstones.

The supplying of grains to the mill is effected at the upper part of the hopper 2. The fixed upper millstone 4 comprises a central passage having a laterally offset portion 22 comprising a channel through which the grains descend vertically in order to arrive by natural gravitation at the nip between the millstones 4 and 5. The central opening of millstone 4 has substantially height; and channel 22 is higher than it is wide.

The shaft 6' of the motor 6 is extended upwardly in a shaft 23 of reduced cross-sectional configuration, that extends axially through the nether millstone 5 and at its upper end is provided with screw threading 24. Notice that screw threading 24 extends quite close to but does not contact the side wall of the generally cylindrical central opening through upper millstone 4, with which it is vertically co-extensive for a substantial distance. Thus, there is a generally cylindrical central passageway through the upper millstone, which is almost completely occupied by shaft 23 and screw threading 24, and from which channel 22 is disposed to one side. Of course screw threading 24 does not extend into channel 22 but substantially closes one vertical side of channel 22, the other sides of channel 22 being closed by the metal upper casing of upper millstone 4, whose upper surface comprises the truncated conical downwardly inwardly inclined bottom of hopper 2. The contact area between millstones 4 and 5 is likewise truncated conical, but is inclined downwardly outwardly.

Still farther up, above the uppermost margins of the central opening of upper millstone 4, shaft 23 is cut away so as to leave a portion thereof which is laterally offset to one side of the lower portion of shaft 23 but still lies within the contour of shaft 23. This laterally offset portion 25 is, in the illustrated embodiment, only a quarter of the original, as seen in FIG. 3, and retains its associated portion of the screw threading 24.

In operation, motor 6 turns shafts 6' and 23 in a direction such that screw threading 24 serves as a screw conveyor to move grains upwardly, which in the illustrated embodiment is clockwise as seen in FIG. 3. This produces two results: in channel 22, the effect is that one side of the channel tends to move grains in the channel upwardly. But the grains are of course smaller than the channel, so that their downward motion by gravity through channel 22 is not impeded. At the same time, it is impossible for grains to become blocked in channel 22, because those that would tend to cause blockage would be moved upwardly by screw threads 24, out of the channel, or at least into a position in which they can fall by gravity through channel 22 to the nip between the millstones.

The second result of the screw threads 24 functioning as an upwardly acting screw conveyor, is to impart upward movement to the grains adjacent the opening to the central passage, so that they do not tend to bridge over or block flow of grains into channel 22. Thus channel 22 cannot be starved for grain, because there will always be grain falling by gravity to the upper end of channel 22.

A third aspect of the operation of screw-threaded shaft 23 is due to its laterally offset portion 25 at the upper end thereof. This portion serves as a stirrer of the grains, thanks to its lateral offset and further prevents bridging and blocking of the grains and further assures the continuous supply of grains to the upper end of channel 22. In this connection, the screw threading on the part-cylindrical side of portion 25 continues to perform the function of raising the grains so as to prevent bridging and clogging.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A mill for the production of meslins and flours, comprising a fixed annular upper millstone and a rotatable lower millstone, said millstones having a common vertical axis, motor means to rotate said lower millstone about said axis, and a screw conveyor fixed coaxially to said lower millstone and extending upwardly through the central opening of said annular upper millstone but spaced from a side wall of said opening a distance sufficient to define with said side wall a vertical channel through which vegetable products fall by gravity to the nip between said millstones, said motor turning said lower millstone in a direction to cause said screw conveyor to feed upwardly.

2. A mill as claimed in claim 1, said channel being laterally offset from said central opening on one side of said screw conveyor.

3. A mill as claimed in claim 1, said screw conveyor extending upwardly beyond the portion of said upper millstone that borders said central opening thereof, said upwardly extending portion of said screw conveyor being laterally offset to one side of the lower portion of said screw conveyor when viewed from above.

4. A mill as claimed in claim 3, there being screw threads on said upwardly extending portion of said screw conveyor which are in continuation of screw threads on a lower portion of said screw conveyor.

5. A mill as claimed in claim 1, said central opening of said upper millstone having substantial height and said channel being higher than it is wide.

6. A mill as claimed in claim 1, the upper surface of said upper millstone being truncated conical and tapering downwardly inwardly.

* * * * *